United States Patent [19]

Lay et al.

[11] Patent Number: 4,919,986
[45] Date of Patent: Apr. 24, 1990

[54] PLASTIC SUCTION CUP ARRANGEMENT FOR LAMINATD GLASS PANE REPAIR

[75] Inventors: Kurt Lay; Erwin Sailer, Alfdorf, both of Fed. Rep. of Germany

[73] Assignee: Daimler-Benz AG, Fed. Rep. of Germany

[21] Appl. No.: 363,714

[22] Filed: Jun. 9, 1989

[30] Foreign Application Priority Data

Jun. 9, 1988 [DE] Fed. Rep. of Germany ....... 3819622

[51] Int. Cl.$^5$ .............................................. F16B 47/00
[52] U.S. Cl. ........................................ 428/43; 428/99; 248/205.5; 248/206.2
[58] Field of Search ............................. 428/43, 64, 99; 248/205.5, 205.7, 205.8, 205.9, 206.1, 206.2

[56] References Cited

U.S. PATENT DOCUMENTS 2,319,727 5/1943 Duggan ........................... 248/205.9
3,514,065 5/1970 Litt et al. ......................... 248/206.2

Primary Examiner—Alexander S. Thomas
Attorney, Agent, or Firm—Barnes & Thornburg

[57] ABSTRACT

A plastic suction cup is disclosed which has an interior collecting pocket, which is slotted in axial direction, for repairing minor damage to laminated safety glass. In its wall, the plastic suction cup has a thinner spot which is provided for the piercing by a hollow needle. This piercing point is located opposite the axial slot of the collecting pocket in such a manner that it can be reached by the hollow needle.

4 Claims, 1 Drawing Sheet

PLASTIC SUCTION CUP ARRANGEMENT FOR LAMINATD GLASS PANE REPAIR

BACKGROUND AND SUMMARY OF THE INVENTION

The invention relates to a plastic suction cup made of a flexible transparent material which can be placed in a sealing manner on a glass pane and, in a vacuum-tight manner, can be pierced with a hollow needle for pane repair operations and the like.

According to the previous state of the art—see German patent (DE-PS) 36 07 738—minor stone throw damage to laminated safety glass is repaired by generating a slight vacuum over the spot to be repaired by means of a suction cup and then, by means of a one way syringe, piercing the outer skin of the suction cup, which is homogeneous with respect to the wall thickness, in order to introduce the repair resin. In this case, it was found over and over again that, on the one hand, it is quite difficult to pierce the outer skin with the needle because the suction cup rests on the glass too flatly when the vacuum is too high, and, on the other hand, the repair resin will continue to flow to the lower part of the plastic suction cup.

An object of the invention consists of permitting an easy insertion for the hollow needle of the one-way syringe, and to hold the introduced resin at the damaged spot in a targeted manner, i.e, largely preventing a running of the repair resin.

According to the invention, this object is achieved by a suction cup arrangement wherein a wall of the plastic suction cup has a spot which is thinner than its remaining wall thickness for accommodating the piercing by the hollow needle, and wherein a collecting pocket is provided in the interior of the plastic suction cup which can be reached by the hollow needle, which collecting pocket is open in the same direction as the suction cup itself and the front edge of which collecting pocket is set back with respect to a contact edge of the plastic suction cup and which, at its circumference, has an opening pointing to the thin spot, for the passage of the hollow needle.

It is the advantage of the invention that, when the suction device is used, it can no longer be pressed too flatly against the glass because of the distance-securing collecting pocket, and thus the hollow needle of the injection syringe, which contains the repair resin, reaches the collecting pocket in a targeted and reliable manner. This syringe also has the advantage that, on the one hand, as a result of the transparency of the used material, it can be placed on the damaged spot in a targeted manner while determining the limits. On the other hand, it is used as a storage space for the repair medium, and the resin can therefore no longer flow into the lower-positioned part at the edge of the plastic suction cup.

Other objects, advantages and novel features of the present invention will become apparent from the following detailed description of the invention when considered in conjunction with the accompanying drawings.

BREIF DESCRIPTION OF THE DRAWINGS

FIG. 1 is a suction cup with a fixed handle constructed in accordance with a preferred embodiment of the invention; and FIG. 2 is a top view of FIG. 1.

DETAILED DESCRIPTION OF THE DRAWINGS

Figure 1:
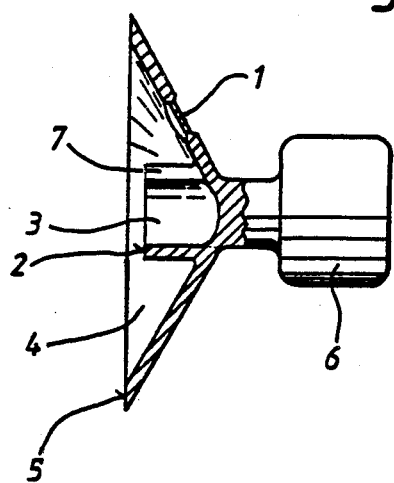
Figure 2:
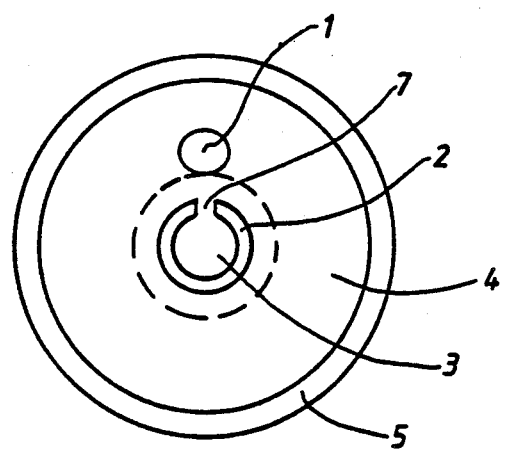

FIG. 1 is a cross-sectional view of a plastic suction cup constructed in accordance with the invention. The thin spot 1 in the wall 5 of the plastic suction cup is clearly visible. Also shown is the collecting pocket 2 located in the interior of the plastic suction cup, the edges of this collecting pocket 2 being set back with respect to those of the plastic suction cup. The collecting pocket 2 has a axial slot 7, which is opposite the thin spot 1. In addition, in the embodiment shown, a handle piece 6 is mounted at the wall 5 of the plastic suction cup, in the present case, the handle piece 6 and the plastic suction cup being one piece. Embodiments are also contemplated wherein the handle piece 6 is constructed to have a suction ball which is connected with the inside volume of the plastic suction cup, or as a connection for a vacuum source.

The method of operation using the plastic suction cup is as follows:

The plastic suction cup is pressed on the damaged spot of a glass pane, and the wall 5 yields way as a results of its elasticity. Excess air is pressed out of the interior 4 until the edges of the collecting pocket 2 rest on the glass and are partially compressed. The handle piece 6 is pulled to such an extent that a vacuum is generated in the interior 6, the edges of the collecting pocket 2 still resting on the glass. By means of a hollow needle of an injection syringe, the thin spot 1 of the shell 5 of the plastic suction cup is pierced and the tip of the hollow needle is placed in the axial opening 7 of the collecting pocket 2 which points upwards. Now the repair resin is filled into the storage space 3. In the process, it flows into the damaged spot. When the plastic suction cup is removed from the glass, the spot of repair resin is under atmospheric pressure. As a result, the repair resin is pressed into the damaged spot filled in a vacuum. The hardened excess of synthetic resin may be scraped off with a knife.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A plastic suction cup made of a flexible transparent material which can be placed in a sealing manner on a glass pane and, in a vacuum-tight manner, can be pierced with a hollow needle for pane repair operations and the like, wherein a wall of the plastic suction cup has a spot which is thinner than its remaining wall thickness for accomodating the piercing by the hollow needle, and wherein a collecting pocket is provided in the interior of the plastic suction cup which can be reached by the hollow needle, which collecting pocket is open in the same direction as the suction cup itself and the front edge of which collecting pocket is set back with respect to a contact edge of the plastic suction cup and which, at its circumference, has an opening pointing to the thin spot for the passage of the hollow needle.

2. A plastic suction cup according to claim 1, wherein the collecting pocket is constructed in the shape of an axially slotted cylinder, the slot being provided opposite the thin spot in the wall of the plastic suction cup.

3. A plastic suction cup according to claim 2, wherein a handle mounted at the plastic suction cup is constructed as a suction ball connected with the interior of the suction cup.

4. A plastic suction cup according to claim 1, wherein a handle mounted at the plastic suction cup is constructed as a suction ball connected with the interior of the suction cup.

* * * * *